United States Patent [19]

Kauffman et al.

[11] Patent Number: 5,453,144
[45] Date of Patent: Sep. 26, 1995

[54] METHOD OF MAKING BIODEGRADABLE CIGARETTE FILTERS USING WATER SENSITIVE HOT MELT ADHESIVES

[75] Inventors: Thomas F. Kauffman, Easton, Pa.; Joseph Wieczorek, Jr., Pittstown; Stephen F. Hatfield, Somerville, both of N.J.

[73] Assignee: National Starch and Chemical Investment Holding Corporation, Wilmington, Del.

[21] Appl. No.: 206,316

[22] Filed: Mar. 4, 1994

[51] Int. Cl.$^6$ .............................. A24D 3/02; B32B 31/04
[52] U.S. Cl. .................. 156/213; 131/361; 131/362; 156/217; 156/327; 493/39; 493/41
[58] Field of Search ...................... 156/201, 203, 156/327, 213, 214, 217; 131/343, 361, 365, 362; 428/393; 525/404; 493/39, 41, 50, 49

[56] References Cited

U.S. PATENT DOCUMENTS

| | | | |
|---|---|---|---|
| 3,891,584 | 6/1975 | Ray-Chaudhuri et al. | 260/27 R |
| 4,074,724 | 2/1978 | Morie et al. | 131/343 |
| 4,121,599 | 10/1978 | Newton et al. | 131/331 |
| 5,058,607 | 10/1991 | Carter et al. | 131/58 |
| 5,217,798 | 6/1993 | Brady et al. | 428/246 |

*Primary Examiner*—Michele K. Yoder
*Attorney, Agent, or Firm*—Ellen T. Dec

[57] ABSTRACT

In a process for manufacturing degradable cigarette filters wherein adhesive is applied to at least one longitudinal edge of the plug wrap paper, a bond is made while the adhesive is molten and the resultant bond is held in compression for sufficient time to prevent bond movement, the improvement which comprises, using as the adhesive, a water sensitive hot melt adhesive comprising 50 to 90 weight percent of a graft copolymer which copolymer comprises 40 to 85 weight percent of at least one vinyl monomer and 15 to 60 weight percent of at least one polyalkylene oxide polymer, 0 to 50 weight percent of a compatible tackifying resin, 5 to 40 weight percent of a polar wax, 0 to 3 weight percent antioxidant and 0 to 30 weight percent of another compatible water soluble or water sensitive thermoplastic polymer; characterized in that the resulting cigarette filter will open when exposed to moisture.

9 Claims, No Drawings

METHOD OF MAKING BIODEGRADABLE CIGARETTE FILTERS USING WATER SENSITIVE HOT MELT ADHESIVES

BACKGROUND OF THE INVENTION

The present invention is directed to the use of water sensitive hot melt adhesives for bonding the paper which wraps the filter element of a cigarette and to cigarette filter elements bonded therewith.

A standard filter tipped cigarette is produced by three different operations: (1) filter or plug manufacture, (2) rod manufacture and (3) tipping.

The cigarette rod consists of a stream of tobacco wrapped in a paper tube, the paper tube being glued along one longitudinal edge with a suitable adhesive. This operation takes place at speeds varying from 2,000 to 16,000 cigarettes per minute. The weight of the cigarette rod, diameter, and length are all closely monitored for both cost control and tax reasons.

The filter making operation is similar in many respects to the rod manufacture, but the materials and manufacturing equipment used are different. Tobacco smoke filters are most commonly manufactured from a crimped textile tow of cellulose acetate fibers. The tow is then warmed and rolled to produce a material about 9" wide, and containing an even distribution of fibers. The tow is "bloomed" in a known manner to separate the fibers, and a high boiling solvent, commonly called a "plasticizer", is applied by spraying, wicking, or other suitable means. The treated tow is then pulled into a cylindrical form and wrapped with paper. During an interval of time, which can be accelerated by heating, the plasticizer first partially dissolves the surface of the fibers causing them to become sticky and to bond together at points of contact with each other. The plasticizer then migrates into the fiber leaving the surface dry, but the fibers still remain bonded.

The bloomed tow is then formed into a tube, and wrapped in paper or plugwrap, the paper being glued along one longitudinal edge. Because of the nature of the tow, there is a high degree of radial stress upon the glued bond, so any adhesive used, must be able to stick almost instantly, and hold during storage and use. This has led to the use of hot melt type adhesives, which by formulation are fast setting, and allow very high machine speeds to be used.

Currently polyethylene and ethylene vinyl acetate based hot melt adhesive are used for this filter or plugwrap application. These are preferred since they are relatively non-polar and resist the deteriorous effects of triacetin, the latter being the most commonly used plasticizer which often migrates acting as a solvent for the adhesive causing bond deterioration.

Growing environmental concerns have led to the desire on the part of cigarette manufacturers to develop cigarette filters which will degrade in water over time. Such use requires a hot melt adhesive which will lose strength in water as when flushed or discarded into the environment. The polar nature of such water sensitive hot melt adhesives generally precludes the use of triacetin plasticizers and the cigarette companies, seeking an environmentally friendlier cigarette, are eliminating triacetin in favor of less desirable plasticizers or other filter materials which do not require plasticizers.

SUMMARY OF THE INVENTION

We have now found that satisfactory water sensitive hot melt adhesives for cigarette filter construction can be prepared from 50 to 90 weight percent of a graft copolymer comprising about 40 to 85 weight percent of at least one vinyl monomer and about 15 to 60 weight percent of at least one polyalkylene oxide polymer, 0 to 50 weight percent of a compatible tackifying resin, 5 to 40 weight percent of a polar wax, 0 to 3 weight percent antioxidant and 0 to 30 weight percent of another compatible water soluble or water sensitive thermoplastic polymer.

These adhesives, while sufficiently polar in nature to be water sensitive and release when exposed to water provide, nonetheless sufficient fast-setting as well as acceptable taste and odor properties to be used in commercial cigarette filter applications. Moreover, the adhesive has a suitable viscosity while in the molten state, but has very good adhesion to cigarette plug wrap papers and to tobacco smoke filter elements.

The adhesive may be applied to the plug wrap paper by any convenient method, for example, using a heated nozzle, or by direct application via a narrow wheel or roller. The application may be carried out on any type of cigarette plug making machine currently in use. The plug wrap bond is made while the adhesive is molten and held in compression until sufficient bond strength has developed to prevent bond movement. Typical application temperatures of the adhesive are 135°–175° C., at which point the viscosity will be suitable for good flow and low bleed through.

The tobacco smoke filter element disclosed herein may therefore be comprised of filamentary tow selected from filaments of cellulose acetate, poly(ethylene terephthalate), polypropylene and polyethylene, and/or biodegradable filter tow materials the filaments being bonded together into a filter element and the element then wrapped in plugwrap, at least one longitudinal edge thereof coated with the previously described hot melt adhesive.

DETAILED DESCRIPTION OF THE PREFERRED EMBODIMENTS

The specific water-soluble polyalkylene oxide polymers used in the graft copolymers described herein have a number average molecular weight of about 3,000 to 100,000 and a polymerized ethylene oxide content of at least 50% by weight. The polyalkylene oxide polymers may be homopolymers of ethylene oxide (including the ester and ether derivatives thereof), random copolymers of ethylene and propylene oxide, block copolymers of ethylene and propylene oxides, or mixtures thereof. It will be noted that mixtures of different polyalkylene oxide polymers may be utilized, and copolymers and homopolymers may be used together in such mixtures. The polymers are commercially available from companies such as Union Carbide (the polyethylene oxide polymers, poly (ethylene oxide/propylene oxide) copolymers and monomethyl ethers of polyethylene oxide), BASF Wyandotte (the block copolymers) and Dow Chemical Company (the homopolymers and random copolymers). More specifically, the Union Carbide products sold under the trade names CARBOWAX (for polyethylene oxides) and METHOXY CARBOWAX (for the monomethyl ethers of polyethylene oxide) have an average molecular weight roughly indicated by the numeral following the trade name.

The polymerized ethylene oxide content of the polyalkylene oxide polymer should be at least 50% by weight of the polymer and preferably at least 75%. Polymers having a lower content of polymerized ethylene oxide groups display only limited solubility in water, and hence are not useful as the water-sensitive polymer component of the present invention. Polyalkylene oxide polymers containing less than about 50% by weight of polymerized ethylene oxide are, however, useful as plasticizers or diluents.

The polyalkylene oxide polymers having a number average molecular weight of less than about 3,000, when used as the sole polyalkylene oxide, have been found not to impart water dispersibility to the graft copolymers, and hence, such lower molecular weight polyalkylene oxide fractions should not be included in determining the proportion of the water-soluble component present in the graft copolymer. On the other hand, low molecular weight polyalkylene oxides (e.g., CARBOWAX 600 from Union Carbide) or very high molecular weight polyalkylene oxides (e.g., POLYOX also from Union Carbide) are useful as plasticizers, diluents or polymeric additives.

The vinyl monomers useful in the graft copolymers of the present invention are preferably vinyl acetate and the lower alkyl-substituted acrylates or methacrylates such as methyl acrylate and ethyl acrylate. Other useful vinyl monomers include the alkyl esters of acrylic acid containing 1 to 10 carbon atoms in the alkyl portion; styrene; and vinyl esters such as vinyl propionate, vinyl butyrate, vinyl 2-ethylhexanote and the like. Use of the vinyl monomers, and in particular the vinyl acetate monomer, provides sufficient chain transfer in grafting to produce a graft copolymer which is thermally stable, moderately polar and readily formulatable into an adhesive. The graft copolymer preferably comprises from about 40 to 85% of at least one vinyl monomer and about 15 to 60% by weight of at least one water-soluble polyalkylene oxide polymer, and most preferably contains 15 to 45% by weight of the polyalkylene oxide component(s).

While various vinyl monomers may be utilized by themselves for grafting onto the water-soluble polymer backbone, small amount of other ethylenically unsaturated monomers may be utilized as comonomers with the vinyl monomer to improve particular properties such as water-dispersibility, adhesion, softness and the like. Monomers useful as comonomers with the vinyl monomers include 2-hydroxyethyl acrylate, N-vinyl pyrrolidone, sodium vinyl sulfonate (the sodium salt of ethylene sulfonic acid) and the alkyl esters of methacrylic acid containing 1 to 8 carbon atoms in the alkyl portion. Such comonomers are generally utilized in quantities not exceeding about 40% by weight of the total graft copolymer.

The graft copolymers used herein as well as a process for the production thereof is described in U.S. Pat. No. 3,891,584 issued Jun. 24, 1975 to Ray-Chaudhuri, et al., the disclosure of which is incorporated by reference.

In addition to the water-soluble polyalkylene oxide polymer or polymers, vinyl monomer or monomers and optional ethylenically unsaturated monomers, the adhesive used herein also contains 5 to 50% by weight of one or more compatible tackifying resins. Exemplary of such tackifying resins are rosin (from gum, wood or tall oil) and the rosin derivatives, the phenolic modified coumarone indene resins (sold by Neville Chemical Company of Neville Island, Pa. under the trade name of NEVILLAC), the coumarone indene resins with softening points of about 5° to 117° C. (sold by the aforementioned Neville Chemical Company under the trade name CUMAR), the phenolic modified terpene resins (sold by Arizona Chemical Company, Inc. of Elizabeth, N.J. under the NIREZ trade name). The softening points of the resins referred to above are Ball and Ring softening points determined using method ASTM E28-58T.

The adhesives of the invention may also contain up to 30%, by weight, preferably 25%, of another thermoplastic polymer. Suitable compatible water soluble or water sensitive thermoplastic polymers include polyvinyl alcohol, partially hydrolyzed polyvinyl acetate, ethylene vinyl alcohol copolymers, ethylene vinyl alcohol copolymers, copolymers polyethyl oxazoline, polyvinylpyrrolidone, vinylpyrrolidone vinyl acetate copolymers, polyvinyl methyl ether, modified starches and dextrins including starch acetate and starch propionate; hydroxyethylcellulose, hydroxypropyl-cellulose, and hydrophobically modified hydroxyethylcellulose.

The adhesive also contains 5 to 40% by weight of a compatible polar wax. Particularly useful are diluents selected from the group consisting of glycerol mono- and distearate, synthetic long chain linear polymeric alcohols, stearic acid, high acid number waxlike materials of mono- or dicarboxylic acids, fatty amide such as the mono-ethanol amide of hydroxy stearic acid, acid wax derived from montan wax, stearyl alcohol, hydrogenated castor oil, ethoxylated alcohols, 12(OH) stearic acid and stearic-cetyl alcohol.

The following examples illustrate the production of suitable hot melt adhesives as well as the use thereof in a variety of applications. In the examples, all parts are by weight and all temperatures in degree Celsius unless otherwise noted. Test procedures used herein are as follows:

TEST PROCEDURES

Melt Viscosities of the hot melt adhesives/binders were determined on a Brookfield RVT Thermosel viscometer using a number 27 spindle at 20 or 50 rpms.

Delamination—Time to Opening in water for cigarette filter (plug) paper.

Cigarette filter papers were cut into 2 inch lengths and 1 inch widths. The hot melt adhesives to be tested were heated to 350° F. and 1 mil thin beads were made on filter paper. A bond was formed between two papers by applying a 200 gm weight.

The samples were immersed in cold tap water in a beaker using a metallic hook and stirred. The time of opening in water was determined.

Tack Testing—The hot melt adhesive was heated to about 350° F. and a film was drawn down on a pad with a glass rod. Tack testing began by taking finger off and on film, counting, to also determine the relative range of hot melt. (This test extremely subjective. Products are rated only by comparison.)

Peel and Shear Test Procedure—Bonds are prepared using a standard kraft paper cut to a size of 3 inches by 1 inch.

The hot melt adhesive is heated to 350° F. and a thin bead applied down the middle of the substrate. Immediately after bead application, a second piece of kraft is placed directly over the first and the bead compressed using a 200 gm weight. The compressed bead should be approximately ½ inch wide.

Six bonds are prepared for each sample—3 peel and 3 shear bonds.

After overnight aging the bonds are then placed in an oven at 100° F. in the peel and shear configurations using 100 gm weights.

The temperature of the oven is raised 10° F. every 15 minutes. The temperatures at which the bonds fail are noted and these are the peel and shear values.

Ring and Ball Softening Point is measured in glycerine bath using the procedures described in ASTM E28-58T.

EXAMPLE I

A useful graft copolymer of 20 parts poly (ethylene oxide) (PEG) and 80 parts vinyl acetate (VA) was prepared by charging the following ingredients into a one liter flask:

| | |
|---|---|
| Polyglycol E-8000 (Dow Chemical Co.) | 200 g |
| t-butyl peroxyperbenzoate | 0.8 g |

The flask was fitted with a stainless steel stirrer, thermometer, condenser, nitrogen inlet tube and dropping funnel containing 800 g of vinyl acetate, 60 g of the vinyl acetate was added and the mixture was heated to reflux. Four ml of a 10% solution of 70% benzoyl peroxide in ethyl acetate was added to initiate the polymerization. The remainder of the vinyl acetate was added over a three hour period. The reaction mixture was heated to 155° to 160° C. and held at this temperature for 15 minutes. Three grams of Irganox 1010 antioxidant (Ciba-Geigy) was added and the residual monomer was removed by vacuum distillation.

The resultant graft copolymer was formulated into a hot melt adhesive by blending at 325° F. with varying amounts of different terpene phenolic resins and waxes as shown in Table I.

TABLE I

| MATERIALS | A | B | C | D |
|---|---|---|---|---|
| Copolymer of Ex. I (80/20) | 50 | 70 | 60 | 60 |
| Nirez 300 terpene phenolic - Arizona Chemical | 50 | — | — | 30 |
| Nirez 2040 terpene phenolic - Arizona Chemical | — | — | 30 | — |
| Castor Wax - Cas Chem | — | — | — | 10 |
| Paracin 220 Wax - Cas Chem | — | 30 | 10 | — |

The resulting adhesives were then tested for the desired performance properties using the procedures described previously. The results are shown in Table II.

TABLE II

| MATERIALS | A | B | C | D |
|---|---|---|---|---|
| VISCOSITY @ | | | | |
| 300° F. | 10,650 | 2,375 | 5,800 | 5,325 |
| 325° F. | 4,650 | 1,290 | 3,030 | 2,587 |
| 350° F. | 2,320 | 870 | 1,775 | 1,550 |
| PEEL | 150° F. | 150° F. | 140° F. | 140° F. |
| SHEAR | 160° F. | 210° F. | 150° F. | 160° F. |
| TIME TO OPENING IN WATER | 3 days | 5 hours | 2 days | 1 hour |
| TACK RANGE | 1–2 Sec. | 2–3 Sec. | 4–5 Sec. | 3–4 Sec. |
| R & B SOFTENING POINT | 206° F. | 220° F. | 195° F. | 191° F. |

EXAMPLE II

A graft copolymer was prepared as in Example I but using quantities of raw materials such as to provide a ratio of 30 parts poly(ethyleneoxide) to 70 parts vinyl acetate. The resulting graft copolymer was formulated as in Table III and tested with results shown in Table IV.

TABLE III

| MATERIALS | E | F | G | H |
|---|---|---|---|---|
| Copolymer (70/30) | 70 | 50 | 90 | 70 |
| Nirez 2150 terpene phenolic - Arizona Chemical | 15 | — | — | — |
| Nirez 2040 terpene phenolic - Arizona Chemical | — | 50 | — | 20 |
| Paracin 220 Wax - Cas Chem | 15 | — | 10 | — |
| Castor Wax - Cas Chem | — | — | — | 10 |

TABLE IV

| MATERIALS | E | F | G | H |
|---|---|---|---|---|
| VISCOSITY @ | | | | |
| 300° F. | 1,460 | 5,150 | 2,762 | 2,345 |
| 325° F. | 980 | 2,425 | 1,755 | 1,320 |
| 350° F. | 685 | 1,450 | 1,210 | 880 |
| PEEL | 140° F. | 130° F. | adj. 110° F. | adj. 110° F. |
| SHEAR | 180° F. | adj. 150° F. | 150° F. | adj. 160° F. |
| TIME TO OPENING IN WATER | 3 days | 5 hours | 1 hour | 2 hours |
| TACK RANGE | 1–2 Sec. | 2–3 Sec. | 2–3 Sec. | 3–4 Sec. |
| R & B SOFTENING POINT | 206° F. | 191° F. | 210° F. | 180° F. |

EXAMPLE III

A graft copolymer was prepared as in Example I but using quantities of raw materials such as to provide a ratio of 40 parts poly(ethyleneoxide) to 60 parts vinyl acetate. The resulting graft copolymer was formulated as in Table V and tested with results shown in Table VI. In this testing, the results were also compared with a conventional cigarette plug adhesive based on an ethylene vinyl acetate copolymer containing 28% vinyl acetate.

TABLE V

| MATERIALS | J | K | L | CONTROL |
|---|---|---|---|---|
| Copolymer (40/60) | 70 | 50 | 90 | EVA - 25 parts |
| Nirez 2040 terpene phenolic - Arizona Chemical | — | 10 | 50 | Kristalex (tackifier) 30 parts |
| Paracin 220 Wax - Cas Chem | 10 | — | — | Paraflint Wax - 45 parts |
| Castor Wax - Cas Chem | — | 10 | — | |

TABLE VI

| MATERIALS | J | K | L | CONTROL |
|---|---|---|---|---|
| VISCOSITY @ | | | | |
| 300° F. | 1,245 | 1,402 | 2,487 | 2,000 |
| 325° F. | 885 | 927 | 1,322 | 1,500 |
| 350° F. | 655 | 615 | 772 | 1,000 |
| PEEL | adj. 120° F. | adj. 110° F. | 110° F. | adj. 140° F. |

TABLE VI-continued

| MATERIALS | J | K | L | CONTROL |
|---|---|---|---|---|
| SHEAR | 150° F. | 110° F. | 120° F. | 190° F. |
| TIME TO OPENING IN WATER | 45 min. | 45 min. | 15 hours | ∞ |
| TACK RANGE | 6–7 Sec. | 6–7 Sec. | 1–2 Sec. | 1–2 Sec. |
| R & B SOFTENING POINT | 202° F. | 182° F. | 175° F. | 224° F. |

The results presented in Tables II, IV and VI clearly illustrate the desirable performance of the graft copolymer based adhesives for cigarette filter applications. Moreover, this results illustrate that, by varying the choice of wax and/or tackifying resin, the degree of water sensitivity (i.e., the time to opening) may be tailored to meet the needs of the particular cigarette manufacturer.

Moreover, these adhesives, while sufficiently polar in nature to be water sensitive and release when exposed to water provide, nonetheless sufficient fast-setting as well as acceptable taste and odor properties to be used in commercial cigarette filter applications.

In summary, the results show that these hot melt adhesives, as well as hot melts prepared from monomers containing other moisture reactive functional groups, may be successfully used to form cigarette filters as described hereinabove. It will be apparent that various changes and modifications may be made in the embodiments of the invention described above, without departing from the scope of the invention, as defined in the appended claims, and it is intended therefore, that all matter contained in the foregoing description shall be interpreted as illustrative only and not limitative of the invention.

We claim:

1. In a process for manufacturing degradable cigarette filters wherein bloomed tow containing triacetin in the form of a tube is wrapped in plug wrap paper, adhesive is applied to at least one longitudinal edge of the plug wrap paper, a bond is made while the adhesive is molten and the resultant bond is held in compression for sufficient time to prevent bond movement, the improvement which comprises, using as the adhesive, a water sensitive hot melt adhesive comprising 50 to 90 weight percent of a graft copolymer which copolymer comprises 40 to 85 weight percent of at least one vinyl monomer and 15 to 60 weight percent of at least one polyalkylene oxide polymer, 0 to 50 weight percent of a compatible tackifying resin, 5 to 40 weight percent of a polar wax, 0 to 3 weight percent antioxidant and 0 to 30 weight percent of another compatible water soluble or water sensitive thermoplastic polymer; characterized in that the resulting cigarette filter will open when exposed to water.

2. The process of claim 1 wherein the graft copolymer in the adhesive contains a polyalkylene oxide polymer having a number average molecular weight of 3000 to 100,000 and a polymerized ethylene oxide content of at least 50% by weight.

3. The process of claim 1 wherein the graft copolymer in the adhesive contains vinyl acetate as the vinyl monomer.

4. The process of claim 1 wherein the graft copolymer in the adhesive comprises 55 to 85 weight percent of the vinyl monomer.

5. The process of claim 1 wherein the tackifying resin in the adhesive is selected from the group consisting of rosin, rosin derivatives, phenolic modified coumarone indene resins, coumarone indene resins with softening points of about 5° to 117° C. and phenolic modified terpene resins.

6. The process of claim 1 wherein the adhesive additionally contains up to 30% by weight of a thermoplastic polymer selected from the group consisting of polyvinyl alcohol, partially hydrolyzed polyvinyl acetate, ethylene vinyl alcohol copolymers, ethylene vinyl acetate vinyl alcohol copolymers, polyethylene oxazoline, polyvinylpyrrolidone, vinylpyrrolidone vinyl acetate copolymers, polyvinyl methyl ether, modified starches and dextrins, hydroxyethylcellulose, hydroxypropylcellulose and hydrophobically modified hydroxyethylcellulose.

7. The process of claim 1 wherein the adhesive contains 5 to 40% by weight of a compatible polar wax selected from the group consisting of glycerol mono- and distearate, synthetic long chain linear polymeric alcohols, stearic acid, high acid number waxlike materials of mono- or dicarboxylic acids, fatty amides, acid wax derived from montan wax, stearyl alcohol, hydrogenated castor oil, ethoxylated alcohols, 12(OH) stearic acid and stearic-cetyl alcohol.

8. The process of claim 1 wherein the tow is formed from filaments selected from the group consisting of cellulose acetate, poly(ethylene terephthalate), polypropylene, and polyethylene.

9. The process of claim 1 wherein the tow comprises a biodegradable filter material.

\* \* \* \* \*